United States Patent [19]

Trias

[11] Patent Number: 4,611,245

[45] Date of Patent: Sep. 9, 1986

[54] REAL-TIME ULTRA-HIGH RESOLUTION IMAGE PROJECTION DISPLAY USING LASER-ADDRESSED LIQUID CRYSTAL LIGHT VALVE

[75] Inventor: John Trias, La Mesa, Calif.

[73] Assignee: The United States of America as represented by the Secretary of the Navy, Washington, D.C.

[21] Appl. No.: 643,216

[22] Filed: Oct. 29, 1984

[51] Int. Cl.$^4$ .............................................. H04N 5/74
[52] U.S. Cl. ..................... 358/235; 358/236; 358/231; 358/60; 350/371
[58] Field of Search .............. 358/236, 235, 231, 60, 358/61, 63; 350/370, 380, 371, 374

[56] References Cited

U.S. PATENT DOCUMENTS

| | | | |
|---|---|---|---|
| 3,514,534 | 5/1970 | Korpel | 358/235 |
| 3,549,800 | 12/1970 | Baker | 358/63 X |
| 3,703,137 | 11/1972 | Anderson et al. | 350/371 X |
| 3,713,721 | 1/1973 | Watson | 358/61 X |
| 3,723,651 | 3/1973 | Gorog | 358/236 |
| 3,727,001 | 4/1973 | Gottlieb | 358/235 |
| 3,818,129 | 6/1974 | Yamamoto | 358/60 |
| 3,894,182 | 7/1975 | Yamamoto et al. | 358/231 |
| 4,295,159 | 10/1981 | Carollo et al. | 358/22 |

Primary Examiner—James J. Groody
Assistant Examiner—E. Anne Toth
Attorney, Agent, or Firm—Robert F. Beers; Ervin F. Johnston; Thomas Glenn Keough

[57] ABSTRACT

A wide screen display enables a number of viewers the simultaneous viewing of rapidly updated data in real time at video rates. A beam of coherent radiation from a laser is modulated at video rates in an acousto-optic modulator. The modulated beam is fed to an X-scanner that imparts an acousto-optic displacement of the modulated beam in the X-direction. A Y-scanner is aligned to receive the X-scanned modulated beam and imparts an acousto-optic reciprocal displacement of the beam so that the video modulated beam is displaced in both the X- and Y-directions. A liquid crystal light valve is disposed to receive the X and Y displaced modulated beam so that it scans the surface of the light valve to stimulate the photosensor layers within. This causes the impression of a replica voltage pattern on a bi-refringent liquid crystal in the valve. A high intensity lamp projects a high intensity incoherent light beam onto the liquid crystal light valve via a polarizing biprism. Since the bi-refringent liquid crystal has been modulated by the X- and Y-scanned modulated coherent beam, a corresponding image is reflected from the bi-refringent liquid crystal and onto the screen. The acousto-optic modulation X-scan and Y-scan occur at much higher rates and with greater control than conventional arrangements so that the resolution of two about 2,000 lines at a video rate is possible. The real-time display provides a number of viewers with a more realistic image so that responsive decisions and actions may be taken.

11 Claims, 7 Drawing Figures

REAL-TIME ULTRA-HIGH RESOLUTION IMAGE PROJECTION DISPLAY USING LASER-ADDRESSED LIQUID CRYSTAL LIGHT VALVE

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED APPLICATIONS

This application is related to a co-pending patent application in the United States Patent and Trademark Office Ser. No. 446,292 entitled "Real-Time Ultra-High Resolution Image Projection Display Using Laser-Addressed Liquid Crystal Light Valve".

BACKGROUND OF THE INVENTION

This invention relates to large screen displays for presenting images to a number of viewers. More particularly this invention concerns a large screen display capable of operating in real-time at high resolution rates and the presentation of video information. In still greater particularity this invention provides for an electronic driven acousto-optic modulation of a coherent beam and its acousto-optic deflection in the X-direction and Y-direction to enable higher resolution portrayal of information at video rates on a remote screen.

The advantage of presenting information to a large group of viewers on a screen has long been appreciated. Educators and managers frequently use such displays when getting their point across. A noteworthy advance in this field is the display that was referenced above. Its use of the liquid crystal light valve to modulate the high intensity lamp to project the high-resolution image to the screen represents a need long felt in the art. The improved resolution afforded by its modulated coherent writing beam and the responsiveness of the liquid crystal light valve to modulate the incoherent light projection beam were largely responsible for its improved capability; however, the mechanical scanning arrangement shows disadvantages such as mirror facet errors, mechanical wobble, and realignment because of bearing wear and introduces limitations with respect to the resolution and the rate at which an effective presentation could be made.

Several approaches for displaying information have been developed, among them being: U.S. Pat. No. 3,514,534 has a laser TV display system using Acousto-optic Bragg cells for both the laser modulator and for the horizontal deflector; but, for the vertical deflector a mechanical deflector is used to direct the beam onto a screen. U.S. Pat. No. 3,723,651 shows a laser beam modulated by a video signal and deflected by x and y deflectors to form an image on a transmissive liquid crystal light valve. The liquid crystal used operates in a transmissive dynamic scattering mode and used a flashlamp to alternately project the image then erasure of liquid crystal image at 60 images per second. The x and y deflector components are not identified. Another U.S. Pat. No. 3,727,001 has a real-time, two-dimensional imaging apparatus employing laser scanning of an acousto-optic array of elements and r.f. driven signals to convert an acoustic image pattern into a visual display. The U.S. Pat. No. 3,818,129 discloses a direct laser imaging device (no light valves) including beam shaping optics, laser modulators, laser projection optics, and employing more than one laser source to produce color displays. Another U.S. Pat. No. 3,894,182 provides a picture display device intensity modulating a light beam by a video signal and a light receiving surface is scanned employing mechanically driven mirrors. Still another U.S. Pat. No. 4,295,159 has a real time display device using a CRT driven liquid crystal light valve and associated projection optics.

Thus, there is a continuing need in the state-of-the-art for an all-solid-state optical scanning device with no mechanical moving parts device for stability and reliability of operation a high resolution in the neighborhood of 2,000 lines or higher at video scan rates to more effectively display information on a wide screen.

SUMMARY OF THE INVENTION

The present invention is directed to providing an apparatus for displaying real-time, ultra-high resolution projected images on a distant screen in accordance with video image signal rates. A laser provides a beam of coherent visible light or infrared radiation and an acousto-optic modulator receives the coherent beam and modulates it at video rates. A means is disposed to receive the video rate modulated coherent beam from the modulating means for reciprocally imparting a scanning thereof in an X-direction. Means is disposed to receive the X-direction reciprocally scanned modulated coherent beam for reciprocally imparting a scan thereof in a Y-direction. The X-direction and Y-direction reciprocally imparting means are acousto-optical modulators. Optionally the Y-direction reciprocally imparting means is a galvanometer driven mirror, or in the case of the Y-scan galvonometer driven mirror, providing appropriate signals. A means is coupled to the modulating means, the X-direction scan reciprocally imparting means and the Y-direction scan reciprocally imparting means for acousto-electronically controlling the modulation, the X-direction scan and the Y-direction scan. Means is aligned to receive the X- and Y-direction reciprocally scanned modulated coherent beam for selectively changing the polarization orientation of linearly polarized light incident thereon in direct response to the voltage pattern directly produced therein by the X- and Y-direction reciprocally scanned modulated coherent beam. Means is disposed for projecting a high intensity incoherent light beam in a light path to the light reflectivity selectively changing means. A means is interposed in the light path between the light polarization orientation changing means and the high intensity light beam projecting means for reflecting linearly polarized high intensity light onto the light polarization orientation changing means and for directing modulated reflected high intensity light modulated in accordance with the X- and Y-direction reciprocally scanned modulated coherent beam onto the distant screen in the form of real-time, high-resolution images at video rates.

The prime object of the invention is to provide an improved high resolution large screen display of information in real time operation at video scan rates.

Another object is to provide for an all-solid-state with no mechanical moving parts acousto-optic beam scanners for a two-dimensional raster scan format of coherent light at video scan rates.

Still another object is to provide two high resolution tellurium dioxide crystals functioning as horizontal and vertical laser beam deflectors.

Another object is to provide an X-direction solid state deflector and a galvanometer driven mirror for the Y-direction scan to photoactivate an LCLV.

Yet another object is to provide an improved large screen display capable of real-time, ultra-high resolution projected images at video image signal rates.

Another object is to provide an improved display having electronically driven acousto-optic beam deflectors in the X (horizontal) and Y (vertical) direction using no mechanical moving parts for scanning the modulated beams at video scan rates.

Another object is to provide an improved display having a modulated coherent beam deflected with no moving mechanical parts in the X- and Y-direction by acousto-optic beam deflectors onto a liquid crystal light valve.

Yet another object is to have an acousto-optic modulated and deflected coherent light beam projected onto a liquid crystal light valve and a separate polarized beam from a high intensity incoherent light source being modulated by the liquid crystal molecules in the light valve, for projection onto a wide screen display.

Yet another object is to provide an improved wide screen display being less susceptible to ambient influences by reason of the inclusion of electronically driven acousto optical modulator and X- and Y-beam deflectors that is conveniently packaged and of reduced size.

These and other objects of the invention will become more readily apparent from a consideration of the ensuing specification and drawings when taken with the appended claims.

DESCRIPTION OF THE PREFERRED EMBODIMENTS

Figure 1:
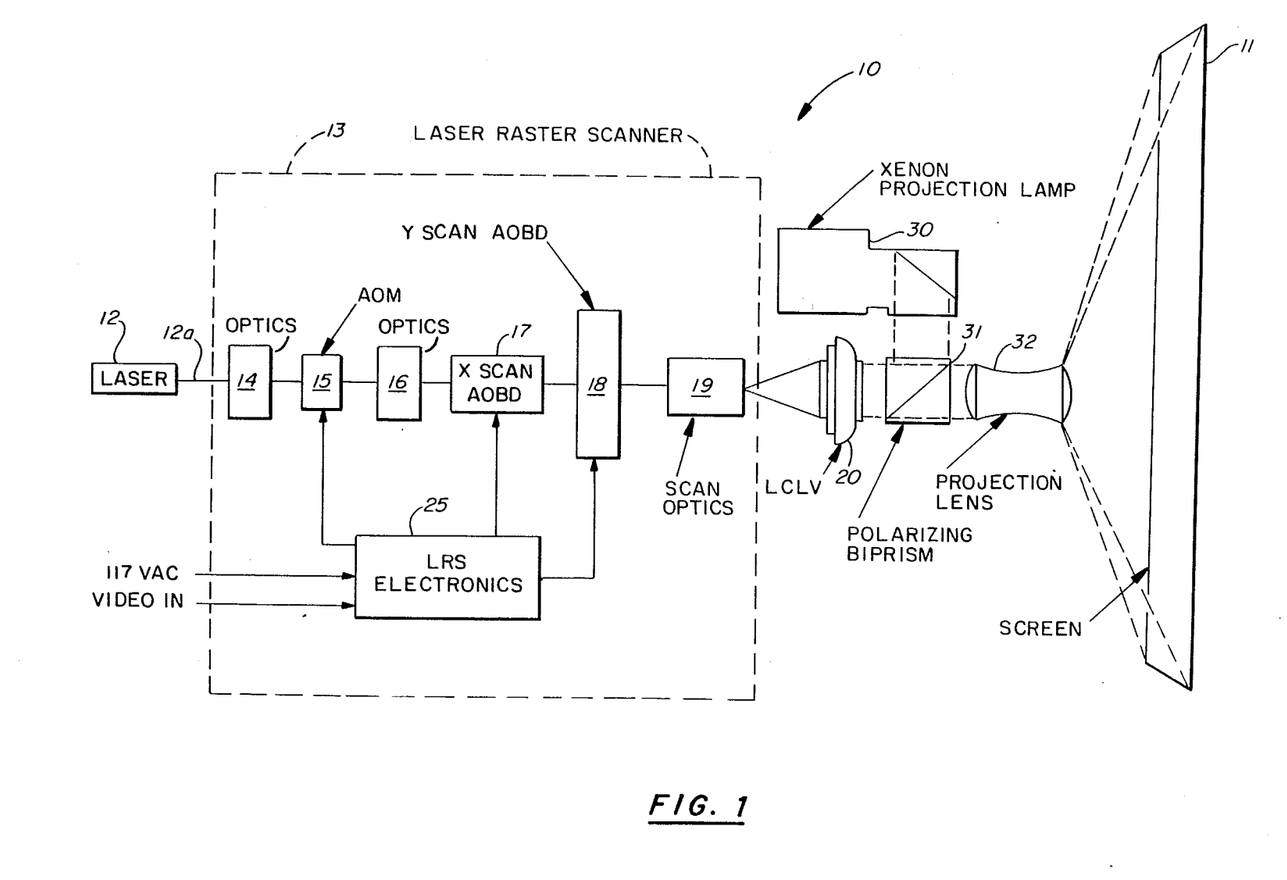
FIG. 1 shows a block diagram representation of the principal constituents of this inventive concept.

Referring now to FIG. 1 of the drawings and improved visual display system 10 is fabricated and assembled from operatively interrelated elements to provide a real-time, ultra-high resolution of video information signals on a remote display screen 11. The size of the screen can vary and can be from a number of feet to nearly wall-size and yet provide the advantages afforded by the concept that include improved resolution and response time to enable the projection of a sizeable image. The display on the screen enables a number of viewers to simultaneously view it and to act accordingly. This feature is particularly desirable and completely within the capability of this invention so that rapidly updated video information can be presented for responsive action.

A laser 12 is the source of a coherent beam 12a that ultimately results in the real-time display of video information on the screen. An argon-ion laser has proven successful for producing the beam in a diameter of about 50 microns at 514.5 nanometer wavelength radiation from the laser in the TEM$_{00}$ mode has proven most satisfactory and a typical model would be the Model 65-.1 or Model 95-4 by Lexell Corporation which generates the narrow width beam in the green wavelength. Although any one of several wavelengths and spot sizes could be chosen including infrared, this particular unit was selected to allow a matching of its spectral response to other components which will be discussed in detail further on. Beam 12a is received by a laser raster scanner 13 that incorporates a high speed, high resolution laser modulator and beam deflector capabililty and has the electronics along with the appropriate optics to provide for laser addressing a high resolution liquid crystal light valve 20.

The laser raster scanner has as its principal constituents, an optics package 14, an acousto-optic modulator 15, an interposed optics interface 16, a horizontal, or X-scan, acousto-optic beam deflector 17, vertical, or Y-scan, acousto-optic beam deflector 18, and interfacing optics 19 which direct the modulated and deflected beam to liquid crystal light valve 20. Laser raster scanner electronics 25 are included to assure that a video input signal appropriately modulates and then deflects the modulated coherent beam to assure the proper display of representative images.

The laser raster scanner is completely self-contained and uses an acousto-optic modulator 15 for video modulating the laser beam by a high speed RF driver capable of nanosecond rise times. The video modulated laser beam is then scanned in the horizontal and vertical directions by using solid state X-scan and Y-scan acousto-optic beam deflectors 17 and 18 the details of which will follow.

The horizontal and vertical deflections produces the raster lines and requires a fast sweep and rapid retrace times. This requirement imposes high linearity specifications (0.1%) of the horizontal acousto-optic beam deflector voltage controlled oscillator (VCO) sweep driving the wideband amplifier producing the 525 lines. Since the vertical sweep or better known frame/field rate is much slower, the VCO sweep linearity requirement is greatly reduced.

Figure 2:
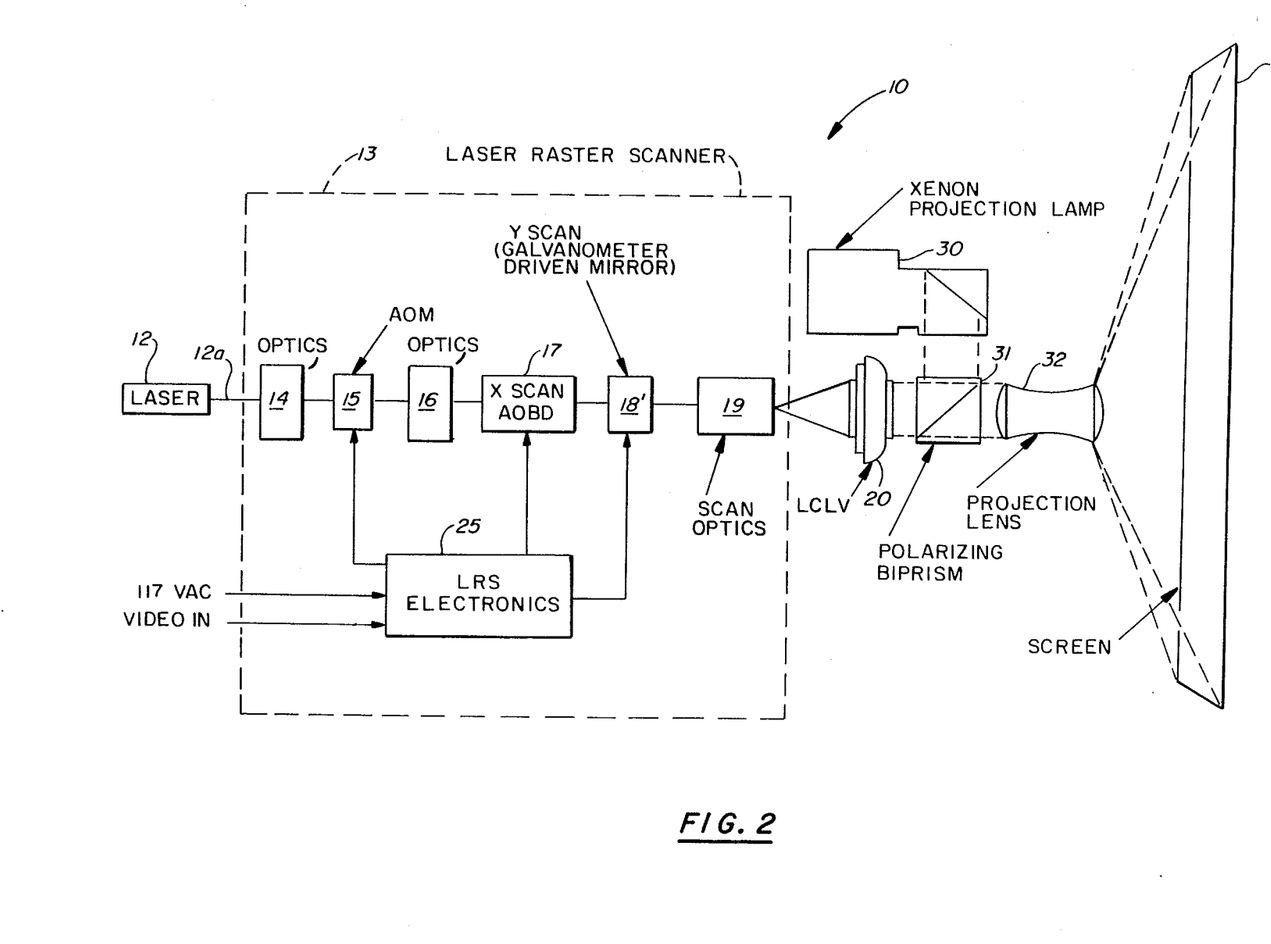
FIG. 2 shows a block diagram of an acousto optic X-scan and a galvanometer driven mirror Y-scan deflector.

The embodiment of FIG. 2 has a galvanometer driven mirror 18' for the Y-deflection of the modulated beam. Typically such a unit is manufactured by Intra-Action Corp. of Bellwood, Illinois as a model VS3. The galvanometer driven mirror is an electromechanically driven mirror that can be driven by signals from laser raster scanner electronics 25 to be described below.

Figure 3:
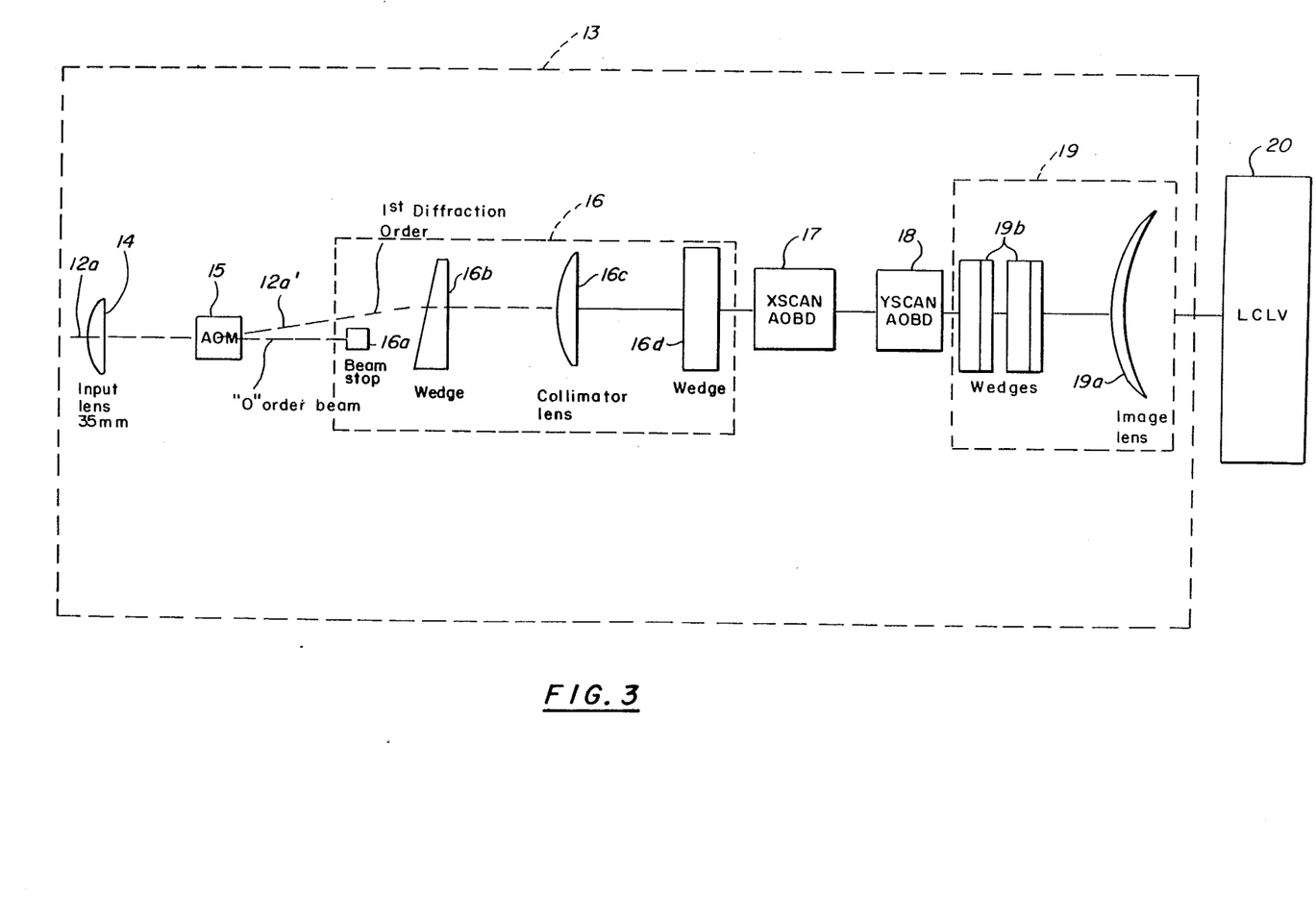
FIG. 3 is a portrayal in greater detail the optical design of the X- and Y-direction scanner of this invention.
Figure 4:
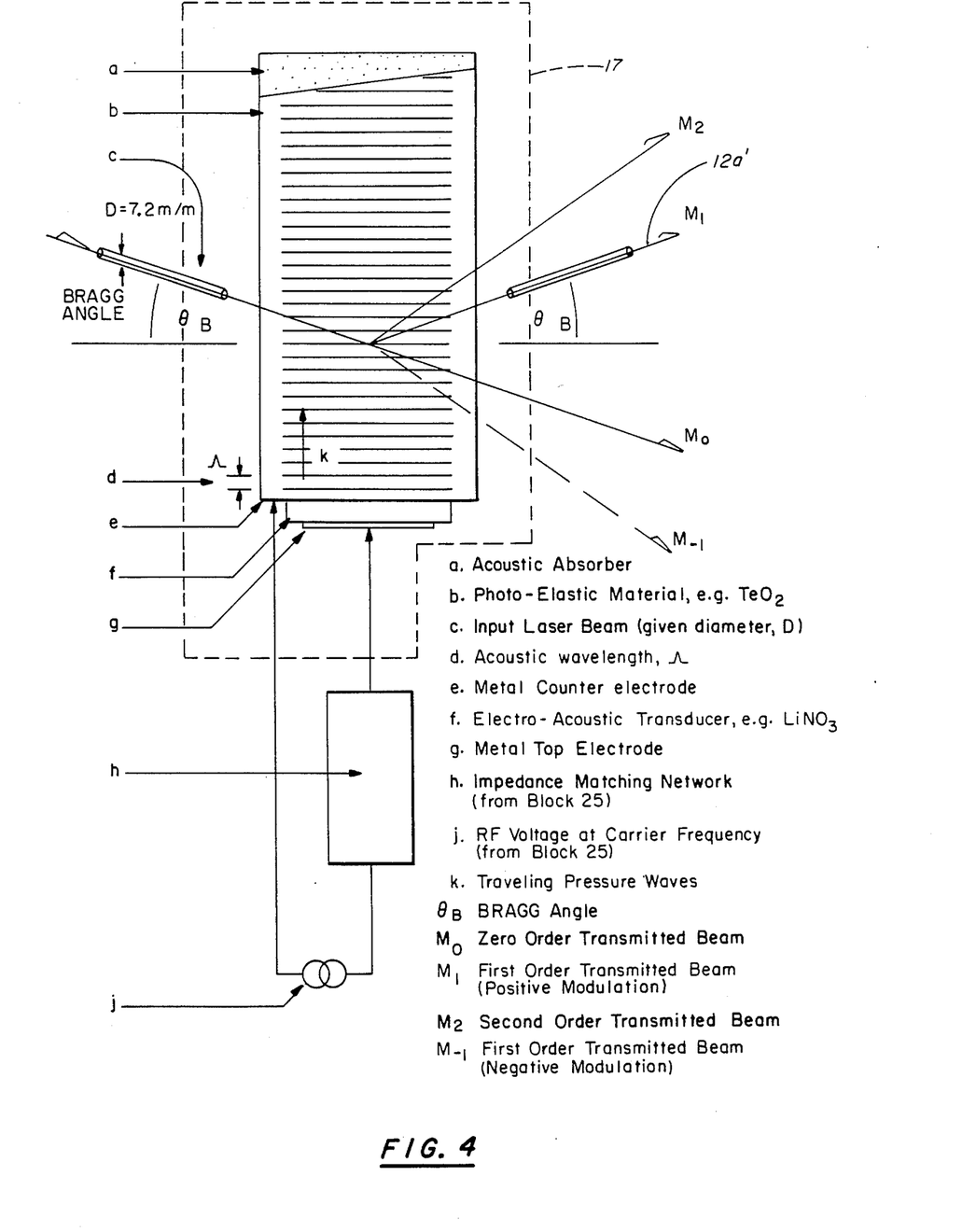
FIG. 4 shows a typical example of an acousto-optic beam BRAGG cell suitable for modulation or deflection.

Referring to the block diagram of FIG. 3 the function and interaction of the components of the laser raster scanner of FIGS. 1 and 2 will be more completely understood with the exception of element 18'. The coherent beam 12a is received by a 35 mm lens of optics 14 to produce a 32 micrometer spot size that is focused onto the TEO$_2$ crystal in acousto-optic modulator 15. The 32 micrometer spot size provides for a very fast rise time within the acousto-optic modulator and assures a possible 100 MHz video bandwidth.

The acousto-optic modulator, more specifically shown in detail as a BRAGG cell in FIG. 3, is a $TEO_2$, 440 MHz carrier frequency modulator having a modulator bandwidth of 100 MHz, a rise time of 5 nanoseconds and it modulates a coherent beam diameter of 32 micrometers with a center frequency of 440 MHz. The length of the transducer is 6.3 mm, its height is 0.2 mm and the acousto-optic Q is 31 with an external BRAGG angle of 54 milliradients. The defraction efficiency is 0.7% milliwatts and a conversion loss of 6 db with a defraction efficiency for 0.5 watts (with the 6 db conversion loss) equal to 73% measured. A typical unit commercially available is the Model N52525 manufactured by Newport Electro-Optics Systems, Inc. of Melbourne, Fla.

The schematic representation of the arrangement of the optics is set forth in FIG. 3 along with the acousto-optic modulator components. The 0 defraction order beam passing through the acousto-optic modulator is fed into a beam stop 16a which need be no more than a suitably arranged black box. The modulated coherent beam 12a' being the first defraction order passed through the acousto-optic modulator is sent to optics block 16 which is in this case a 3° wedge to maintain the modulated coherent beam parallel to the optical axis preestablished in the laser raster scanner. While the configuration of elements shown in FIG. 3 makes them appear to be spread over a considerable distance the beam is translated over 4 mm and is parallel to the d.c. optical axis. The beam stop mentioned before is to prevent laser scattering from washing out to the liquid crystal light valve 20 and creating poor performance. This baffling is critical to obtain the high resolution performance and several other stops are used throughout the system where necessary.

After the wedge another scatter light block, similar in design to block 16a and then a collimator lens 16 (a 196 mm lens) is provided to give a magnification of 196/35=5.6 to provide a light input for the acousto-optic beam deflector 17 of 7.2 mm. The 7.2 mm beam is fed to a wedge 16d to provide the BRAGG angle input to the slow shear $TEO_2$ photo elastic material of the acousto-optic beam deflector. This enables the amount for the acousto-optic beam deflector to have little adjustment and maintains high reliable performance. The 7.2 mm acousto-optic beam deflector 17 input corresponds to an aperture of 11 microseconds which is mechanically apertured to 10 microseconds. The specifications for both of the acousto-optic beam deflectors are that the material is slow shear $TEO_2$ having a bandwidth of 100 MHz with a center frequency of 150 MHz. The processing time equals 10 microseconds with an optical beamwidth of 6.2 mm with an optical beam height of 6.2 mm. The transducer height is 8 mm with a length of 0.1 mm with an acousto-optic Q of 23.6. The defraction efficiency equals 5% per 200 milliwatts with a 6 db conversion loss. The defraction efficiency equals 15% measured at 2.5 watts. The specifications just set up are the same for the horizontal, or X, and vertical, or Y, acousto-optic beam deflectors.

The X-scan and Y-scan acousto-optic beam deflectors are cross-axis acoustically and are as close together as possible to enable the transducer design to be the same for both cells. This keeps the optically spreading beam to a minimum width. Due to the acoustic lensing of the fast sweep horizontal acousto-optic beam deflector 17 and the device behaving as a 415 mm lens, there is no need to have an optical lens for the horizontal axis. As a consequence the only image lens is a cylindrical lens 19a in optics 19 to focus the vertical axis to provide for a 1:1 format of 35×35 millimeter size, the cylindrical lens 19a must have a 380 mm focal length. However, between the Y-scan acousto-optic beam deflector 18 and image lens 19a two wedges 19b must be provided to assure angle correction for the BRAGG angle at the center frequency and to keep the optical beam on the optical axis with minimal translation. In addition this provides more aperture to prevent light scattering that might otherwise be detected by liquid crystal light valve 20 with a consequent distortion of the projected image on display screen 11.

Finally the image size is 35 mm×35 mm with resolution elements of 525 and 525. Resolution of 1,000 by 1,000 and higher can also be achieved by modifying the necessary electronics and optics. This allows a matching with the specifications of the liquid crystal light valve as will be pointed out below.

Figure 5:
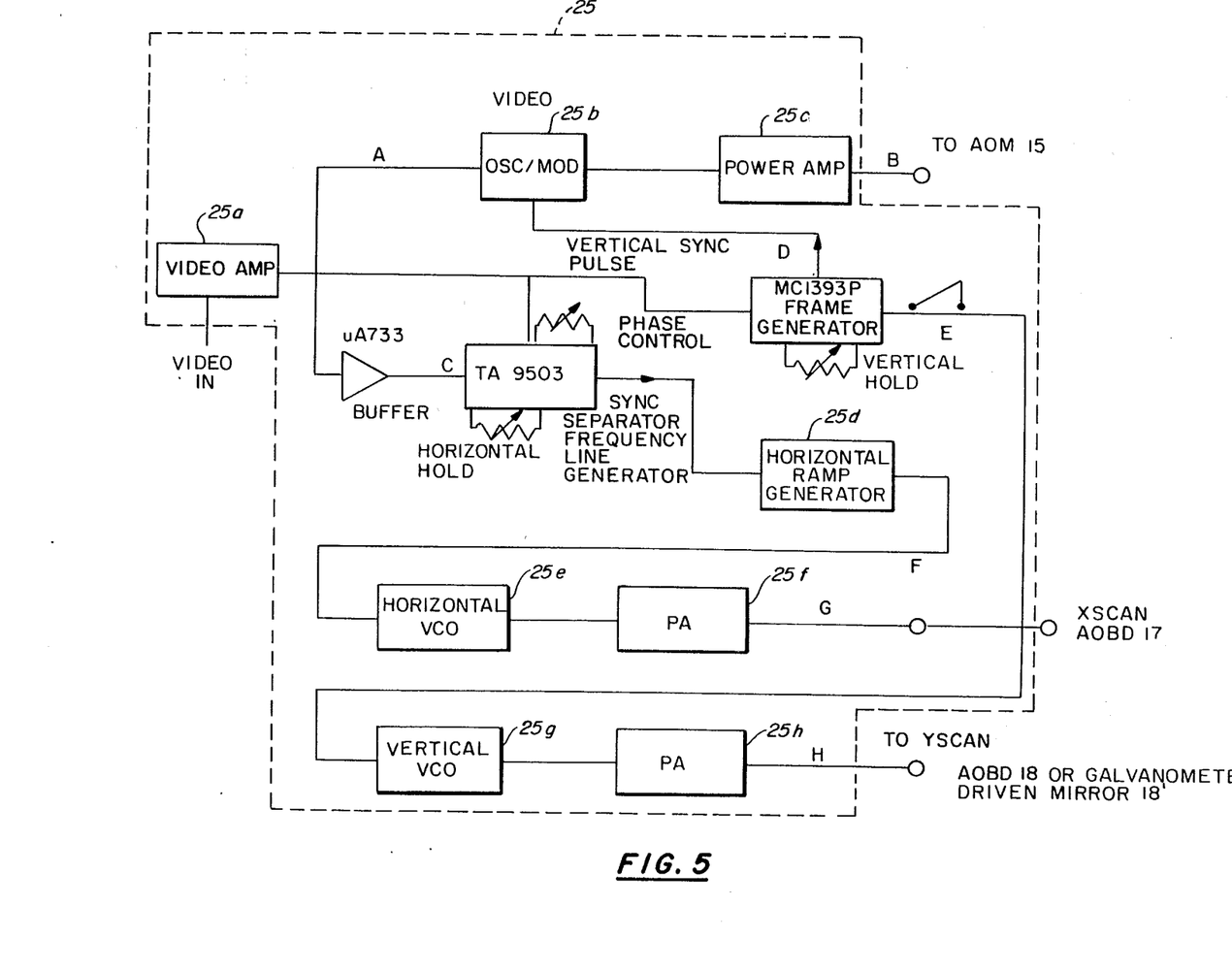
FIG. 5 is a block diagram representation of the laser raster scanner electronics.

The laser raster scanner electronics 25 receives the video in at a video amplifier 25a which feeds the signal to an oscillator modulator 25b and onto a power amplifier 25c. A 440 MHz crystal oscillator is included in the oscillator modulator and is responsive to the video input, the blanking signal to generate a 440 MHz amplitude modulated signal used to drive the acousto-optic modulator 15. The acousto-optic coaction between the modulator and the driver circuitry 25a, 25b and 25c varies the light intensity of the coherent beam 12a so that beam 12a' has, in fact, its light intensity varied in accordance with the modulating video. The video level input to the acousto optical modulator 15 is clearly set forth in FIG. 6. The video amplifier is equipped with gain and offset adjustments for receiving the input video signal and the adjustments have enough range to adjust the levels and offset of any RS 170 video input to the proper amplitudes and offsets required by the driver consisting of the video amplifier 25a, oscillator modulator 25b and power amplifier 25c. The video amplifier has at least 18 to 25 MHz bandwidth.

Figure 6:
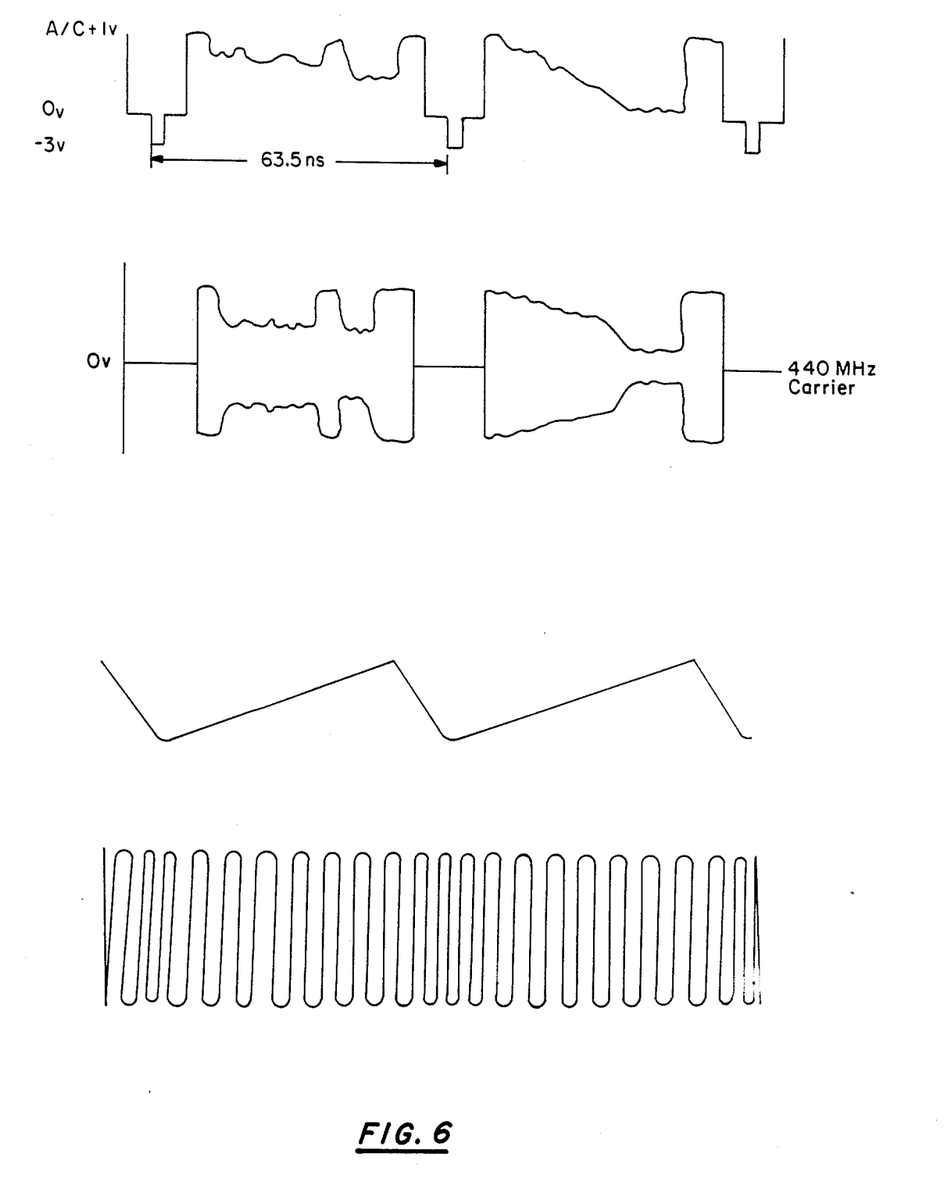
FIG. 6 shows a typical representation of horizontal waveforms for the FIG. 5 electronics.

The function of providing horizontal sweep or X-scan for X-scan acousto-optic beam deflector 17 is depicted by the waveforms shown in FIG. 6. An integrated circuit chip TA9503 is suitably modified for sync separation and to provide a line rate oscillator. The horizontal OSC range is controlled by a horizontal hold appropriately adjusted by an appropriate control associated with the TA9503 chip. The output of the chip is a signal that controls a horizontal sweep generator 25d and a vertical sync output pulse. The horizontal sweep generator used the pulse out of the TA 9503 to synchronize a horizontal ramp generator 25d. The ramp generator has a linearity of better than 1%. There are various offsets and gain adjustments for delay and the voltage scaling, the voltage ramp varies the frequency of a VCO 25e from 100 to 200 MHz linearly. This "chirp" is amplified by a N210300-4 power amplifier 25f to a two-watt signal that drives the X-scan acousto-optic beam deflector 17 which sweeps the modulated coherent beam horizontally.

Figure 7:
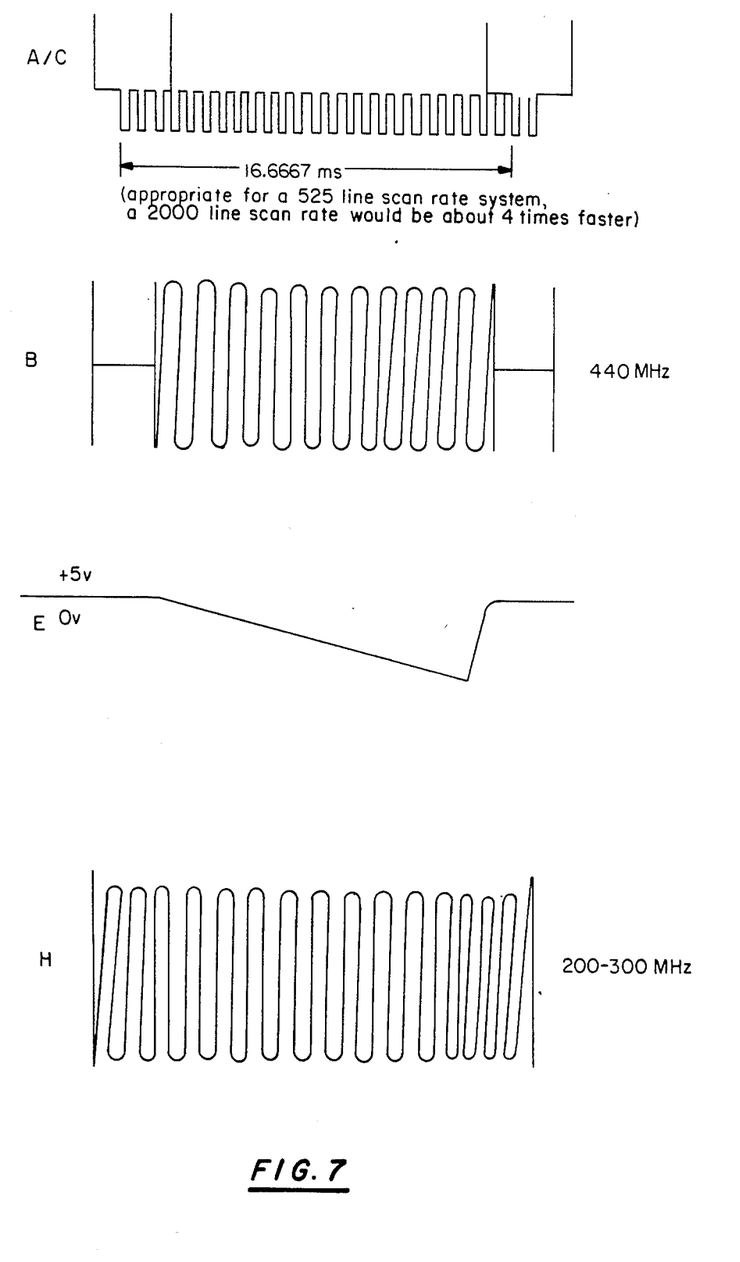
FIG. 7 is a portrayal of the vertical and video waveforms associated with FIG. 5.

The laser raster scanner electronics 25 further provides for the vertical sweep and for this purpose a MC1393P marketed by Motorola Corporation has proven satisfactory. The vertical sync pulse is received from the TA9503 chip and the frame generator is synced to 60 Hz and generates a sawtooth signal. The sawtooth level and amplitude are controlled to produce a signal as shown in FIG. 7. The signal varies the frequency of the vertical VCO 25g linearly from 100 to 200 MHz. This vertical "chirp" is amplified by amplifier 25h and is fed to the Y-scan acousto-optic beam deflector 18 to sweep the light vertically.

There are four user controls which allow for controlling the picture roll in a horizontal direction otherwise referred to as horizontal hold, controlling the picture roll in a vertical direction referred to as vertical hold, and the combination of video gain and offset to adjust the contrast and grey scale. The specifications listed above allow for a displayed image format of 1:1 and a size of 35 mm×35 mm with minimum resolution per RS170 of 450 lines by 400 lines. The scanned rate was 525/60 RS170 EIA standard TV requirements. The number of grey levels was found to be greater than 7 and the optical throwput efficiency is greater than 0.1%. The acousto-optic modulator 15 is adjusted in height location to optimize for the center of the active transducer electrode. Once this is maximized the BRAGG angle is maximized to achieve maximum defraction efficiency. In this regard the optical input is adjusted to the horizontal acousto-optic beam deflector 17 to maximize for scan output as well as intensity uniformity. The vertical acousto-optic beam deflector 18 is then adjusted for maximum efficiency and intensity with uniformity over the scan of the beam coming from the X-scan beam deflector 17. The beam stop blocks is adjusted to reduce and prevent light from scattering in the image plane to achieve high resolution and maximum grey levels on the face of the liquid crystal light valve 20. The two wedges 19b are adjusted to make the scan image parallel to the base plate of the scanner. The image plane is then adjusted for the lensing power of the horizontal scanner. Lastly, the image is then adjusted for proper cylindrical lens 19b to achieve the best focused image at the prescribed plane, that being the incident light plane on the liquid cyrstal light valve 20. If the image size needs increasing there is no difficulty in using relay lenses to achieve proper magnifications in the optical train.

The liquid crystal light valve selected for this application can be one of several. A Hughes liquid cyrstal light valve Model No. 10555 was used with highly satisfactory results. The LCLV photosensor has a 50 mm diameter with a sensitivity of 100 microwatts per square centimeter at 514.5 nanometers. When the modulated coherent beam strikes the 50 mm diameter surface it passes through a transparent conductive electrode and hits a photosensor layer, a cadmium sulphide layer that is responsive to light at this wavelength. An option would be to provide a silicon photosensor layer in the light valve that would be sensitive to near infrared radiation. This would give a faster response time. The photosensor detects the modulated coherent beam and impresses a voltage pattern on the nematic liquid crystal. The voltage pattern of the image on the liquid crystal electrooptically alters the optical properties of the crystal by the phenomenon known as bi-refringence. The valve acts like a controlled bi-refringence mirror and is used to rotate and, hence, selectively modulate linearly polarized light for image generation.

Collimated, unpolarized projection light comes from a high intensity Xenon projection lens 30. The high intensity light from the projection lamp passes through a polarization cube 31. The cube can be a McNeille bi prism that linearly polarizes an incoherent light beam such as that coming from the high intensity Xenon light source.

The light valve performs its function at video rates while maintaining a high resolution and grey scale quality of the image generated by it by reason of the impinging modulated coherent beam. This is because a combination light blocking and dielectric mirror layer is placed to isolate the modulated laser beam from the high intensity projection beam. The dielectric mirror reflects the high intensity Xenon output light back through the liquid crystals and the light blocking layer prevents residual output light leakage to the photosensor. The liquid crystal layer of the light valve acts like a controlled bi-refringence mirror and rotates or modulates linearly polarized light for image generation. The impinging modulated coherent beam falling on the photosensitive elements of the light valve provides a modulated coherent light image that switches the a.c. voltages to the liquid crystal layer. This forms the replica image across the liquid crystal layer by causing the molecules to rotate in accordance with the localized field changes creating a consequent change of bi-refringence. This bi-refringence change causes a change in the polarization output of the plane-polarized high intensity light beam coming from the Xenon projection lamp 30 via the biprism 31. When reflected from the light valve, it passes back through the prism through a projection lens 32 and onto the screen.

Obviously many modifications and variations of the present invention are possible in the light of the above teachings. It is therefore to be understood that within the scope of the appended claims the invention may be practiced otherwise than as specifically described.

I claim:

1. An improved apparatus for displaying real-time, ultra-high resolution projected images on a distant screen in accordance with video image signal rates comprising:

a laser providing a beam of coherent light;

means located to receive the beam of coherent light for modulating it at video image signal rates;

means disposed to receive the video rate modulated coherent light beam from the modulating means for reciprocally imparting a scan thereof in an X-direction;

means disposed to receive the X-direction reciprically scanned modulated coherent light beam for reciprocally imparting a scan thereof in a Y-direction;

means coupled to the modulating means, the X-direction scan reciprocally imparting means and the Y-direction scan reciprocally imparting means for acousto electronically controlling the modulation, the X-direction scan and the Y-direction scan, respectfully;

means aligned to receive the X- and Y-direction reciprocally scanned modulated coherent light beam for selectively changing the polarization orientation of linearly polarized light incident thereon in direct response to the voltage pattern directly produced therein by X- and Y-direction reciprocally scanned modulated coherent light beam;

means disposed for projecting a high intensity light beam in a light path to the light polarization orientation changing means; and means interposed in the light path between the light polarization orientation changing means and the high intensity light beam projecting means for reflecting linearly polarized high intensity light onto the light polarization orientation changing means and for directing modulated reflected high intensity light modulated in accordance with the X- and Y-direction reciprocally scanned modulated coherent light beam onto the distant screen in the form of the real-time, high-resolution images at video image signal rates.

2. An apparatus according to claim 1 in which the light polarization orientation changing means is a liquid crystal light valve and the modulated coherent beam is a writing beam that scans a photosensitive layer of the liquid crystal light valve and the reflected linearly polarized high intensity light is reflected through a liquid crystal layer that effects a modulation of the linearly polarized high linearity projection beam.

3. An apparatus according to claim 2 in which the modulating means is an acousto-optic diffraction modulator modulating the light intensity of the first diffraction order with the video image signals.

4. An apparatus according to claim 3 in which the X-direction scan reciprocally imparting means and the Y-direction scan reciprocally imparting means are two acousto-optic diffraction deflectors affecting the X- and Y-scans in accordance with line scan signals of the video image signals.

5. An apparatus according to claim 2 in which the X-direction scan reciprocally imparting means the Y-direction scan reciprocally imparting means are two acousto-optic diffraction deflectors affecting the X- and Y-scans in accordance with line scan signals of the video image signals.

6. An apparatus according to claim 4 in which the X and Y scan acousto-optic diffraction deflectors are $TeO_2$, tellurium dioxide.

7. An apparatus according to claim 6 in which the modulating acousto-optic diffraction modulator is $TeO_2$, tellurium dioxide.

8. An apparatus according to claim 7 in which the modulated reflected high intensity reflecting and directing means is a polarizing beam splitter.

9. An apparatus according to claim 8 in which the acousto-electronically controlling means is fabricated to assure scanning the modulated coherent light beam at video scan rates using two acousto-optic beam deflectors to provide a raster scanned image onto a liquid crystal light valve.

10. An apparatus according to claim 2 in which the acousto-electronically controlling means is fabricated to assure scanning the modulated coherent light beam at video scan rates using two acousto-optic beam deflectors to provide a raster scanned image onto a liquid crystal light valve.

11. An improved apparatus for displaying real-time, ultra-high resolution projected images on a distant screen in accordance with video image signal rates comprising:

a laser providing a beam of coherent light;

means located to receive the beam of coherent light for modulating it at video image signal rates;

means disposed to receive the video rate modulated coherent light beam from the modulating means for reciprocally imparting a scan thereof in an X-direction;

a galvanometer driven mirror disposed to receive the X-direction reciprically scanned modulated coherent light beam for reciprocally imparting a scan thereof in a Y-direction;

means coupled to the modulating means, the X-direction scan reciprically imparting means and the Y-direction scan reciprocally imparting galvanometer driven mirror for acousto electronically controlling the modulation and the X-direction scan and for electromechanically imparting the Y-direction scan, respectfully;

means aligned to receive the X- and Y-direction reciprocally scanned modulated coherent light beam for selectively changing the polarization orientation of linearly polarized light incident thereon in direct response to the voltage pattern directly produced therein by X- and Y-direction reciprocally scanned modulated coherent light beam;

means disposed for projecting a high intensity light beam in a light path to the light polarization orientation changing means; and means interposed in the light path between the light polarization orientation changing means and the high intensity light beam projecting means for reflecting linearly polarized high intensity light onto the light polarization orientation changing means and for directing modulated reflected high intensity light modulated in accordance with the X- and Y-direction reciprocally scanned modulated coherent light beam onto the distant screen in the form of the real-time, high-resolution images at video image signal rates.

* * * * *